United States Patent [19]
Kobayashi

[11] Patent Number: 5,240,669
[45] Date of Patent: Aug. 31, 1993

[54] METHOD FOR VULCANIZING AN ELASTOMERIC PRODUCT INCLUDING ALTERNATE HEATING AND PRESSURIZING STEPS

[75] Inventor: Michihito Kobayashi, Toyota, Japan

[73] Assignee: Sumitomo Rubber Industries, Ltd., Hyogo, Japan

[21] Appl. No.: 626,067

[22] Filed: Dec. 12, 1990

[30] Foreign Application Priority Data

Dec. 28, 1989 [JP] Japan ................................. 1-340439

[51] Int. Cl.$^5$ ............................................. B29C 35/04
[52] U.S. Cl. ................................. 264/315; 264/40.3; 264/40.6; 264/326; 264/501; 425/29
[58] Field of Search .................. 264/315, 326, 40.3, 264/40.6, 85, 347, 501, 347, 236; 425/29, 42, 34, 42

[56] References Cited

U.S. PATENT DOCUMENTS

| | | | |
|---|---|---|---|
| 2,066,265 | 12/1936 | Freeman | 264/326 |
| 3,443,280 | 5/1967 | Hugger | 264/40.6 |
| 3,443,280 | 5/1969 | Hugger | 425/29 |
| 3,489,833 | 1/1970 | Lehnen | 264/315 |
| 3,579,626 | 5/1971 | Brittain | 264/347 |
| 4,027,543 | 6/1977 | Johnston | 264/85 |
| 4,097,565 | 6/1978 | Cole et al. | 264/85 |
| 4,126,657 | 11/1978 | Gado | 264/315 |
| 4,239,723 | 12/1980 | Williams | 264/315 |
| 4,370,283 | 1/1983 | Arimatsu et al. | 264/315 |
| 4,382,052 | 5/1983 | Arimatsu | 425/29 |
| 4,406,845 | 9/1983 | Sakon et al. | 264/315 |
| 4,422,987 | 12/1983 | Arimatsu | 264/40.3 |
| 4,490,325 | 12/1984 | Mattson et al. | 264/315 |
| 4,779,206 | 10/1988 | Mattson et al. | 264/40.6 |
| 5,020,982 | 6/1991 | Kubota et al. | 264/85 |
| 5,020,982 | 6/1991 | Kubota et al. | 425/42 |
| 5,055,245 | 10/1991 | Hisatomi et al. | 264/40.6 |

FOREIGN PATENT DOCUMENTS

| | | |
|---|---|---|
| 0050956 | 5/1982 | European Pat. Off. |
| 0323164 | 7/1989 | European Pat. Off. |
| 57-185134 | 11/1982 | Japan |
| 2267107 | 11/1987 | Japan ................ 264/315 |

Primary Examiner—Jay H. Woo
Assistant Examiner—Robert B. Davis
Attorney, Agent, or Firm—Birch, Stewart, Kolasch & Birch

[57] ABSTRACT

A method for vulcanizing an elastomeric product placed in a vulcanizing apparatus includes one step of supplying heating medium into the elastomeric product and another step of supplying pressurizing medium into the elastomeric product at a higher pressure than the heating medium, the two steps being performed one after another at least two times. This method can produce an elastomeric product having no bareness without increasing the vulcanizing time.

21 Claims, 7 Drawing Sheets

FIG.7

METHOD FOR VULCANIZING AN ELASTOMERIC PRODUCT INCLUDING ALTERNATE HEATING AND PRESSURIZING STEPS

BACKGROUND OF THE INVENTION AND RELATED ART STATEMENT

This invention relates to a method for vulcanizing an elastomeric product using gas as a pressurizing medium.

In a conventional vulcanization method, an elastomeric product, such as a vehicular tire, is vulcanized by (1) placing the elastomeric product into a bladder containing mold (2) closing the mold while feeding shaping pressure into the bladder so as to bring the elastomeric product into contact with the inner surface of the mold by means of the inflated bladder; (3) supplying steam as a heating medium into the bladder after the mold is completely closed; (4) stopping the supply of steam either when the temperature of the elastomeric product rises to a predetermined level or when a predetermined time has elapsed; (5) supplying combustion gas or nitrogen gas as a pressurizing medium at a pressure equal to or higher than that of the steam; and (6) discharging the mixture of heating and pressuring mediums after a lapse of a predetermined time. In such vulcanization processes, the pipe inlets for supplying the pressurizing and heating mediums are open, while the outlet pipes for discharging the pressurizing and heating mediums are kept closed. In other words, the pipe outlets are dead ends. Also, only steam is used as the heating or bladder side medium to heat the elastomeric product from the inside. The gas is utilized for pressurization purposes.

If the elastomeric product is a large-size tire, a greater quantity of heat is necessary. This is because a large-size tire has a greater thickness than a smaller tire. Accordingly, a longer heating time is usually required for vulcanization of a large-size tire as compared to a smaller tire.

Normally the steam is supplied at a pressure of 13 to 15 kg/cm$^2$, and the gas is supplied at a pressure of 18 to 28 kg/cm$^2$. Accordingly, the steam pressure is lower than the gas pressure.

In the case of vulcanizing a large size tire, it is preferable from a tire quality viewpoint to change to the pressurizing process as soon as possible after starting the heating process. This is because of the trouble caused by air in the rubber or a resulting bareness produced in the cured tire. However, if the heating time is cut short, the to the tire is decreased and the vulcanization will have either a longer cure time as a result of making up for the thermal value shortage, or worse, will have under curing trouble.

It is an object of the present invention to provide a method for vulcanizing an elastomeric product which makes it possible to prevent air from being trapped in the elastomeric product and/or between the mold surface and the elastomeric product, or a bareness from occurring, and cure the elastomeric product without prolonging the cure time.

SUMMARY OF THE INVENTION

According to the present invention, a method for vulcanizing an elastomeric product that is placed in a vulcanizing means which comprises a step of supplying a heating medium to the elastomeric product and a step of supplying a pressurizing medium, at a higher pressure than the heating medium, to the elastomeric product wherein these two steps are performed one after the other and at least twice.

Also, the method according to the present invention comprises (1) supplying the heating medium to the elastomeric product, (2) supplying the pressurizing medium to the elastomeric product, (3) supplying the heating medium to the elastomeric product, and (4) again supplying the pressurizing medium to the elastomeric product.

Further the method according to the present invention comprises (1) supplying the pressurizing medium to the elastomeric product, (2) supplying the heating medium to the elastomeric product, (3) supplying the pressurizing medium to the elastomeric product, (4) supplying the heating medium to the elastomeric product, and (5) supplying the pressurizing medium to the elastomeric product.

In the method of the present invention, the heating process is performed at least twice, and the pressurizing process is performed at least twice. In an early stage of vulcanization when the rubber is fluid-like owing to temperature rise, the pressurizing step of the present invention is performed. In a stage when the air trapped in the elastomeric product and/or between the mold surface and the elastomeric product has been eliminated (or there is no longer the danger of generating bareness in the surface of the elastomeric product) the heating step is preformed. In other words, when it is perceived, judging from the outside appearance of the elastomeric product, that the rubber fluidity has come to an end, the heating pressure is performed again.

Accordingly, the method of the present invention can produce an elastomeric product having no bareness without adding to the cure time.

The above and other objects, features and advantages of the present invention will become more apparent without adding to the cure time.

The above and other objects, features and advantages of the present invention will become more apparent from the following detailed description with reference to the accompanying drawings.

DETAILED DESCRIPTION OF PREFERRED EMBODIMENTS OF THE INVENTION

Figure 1:
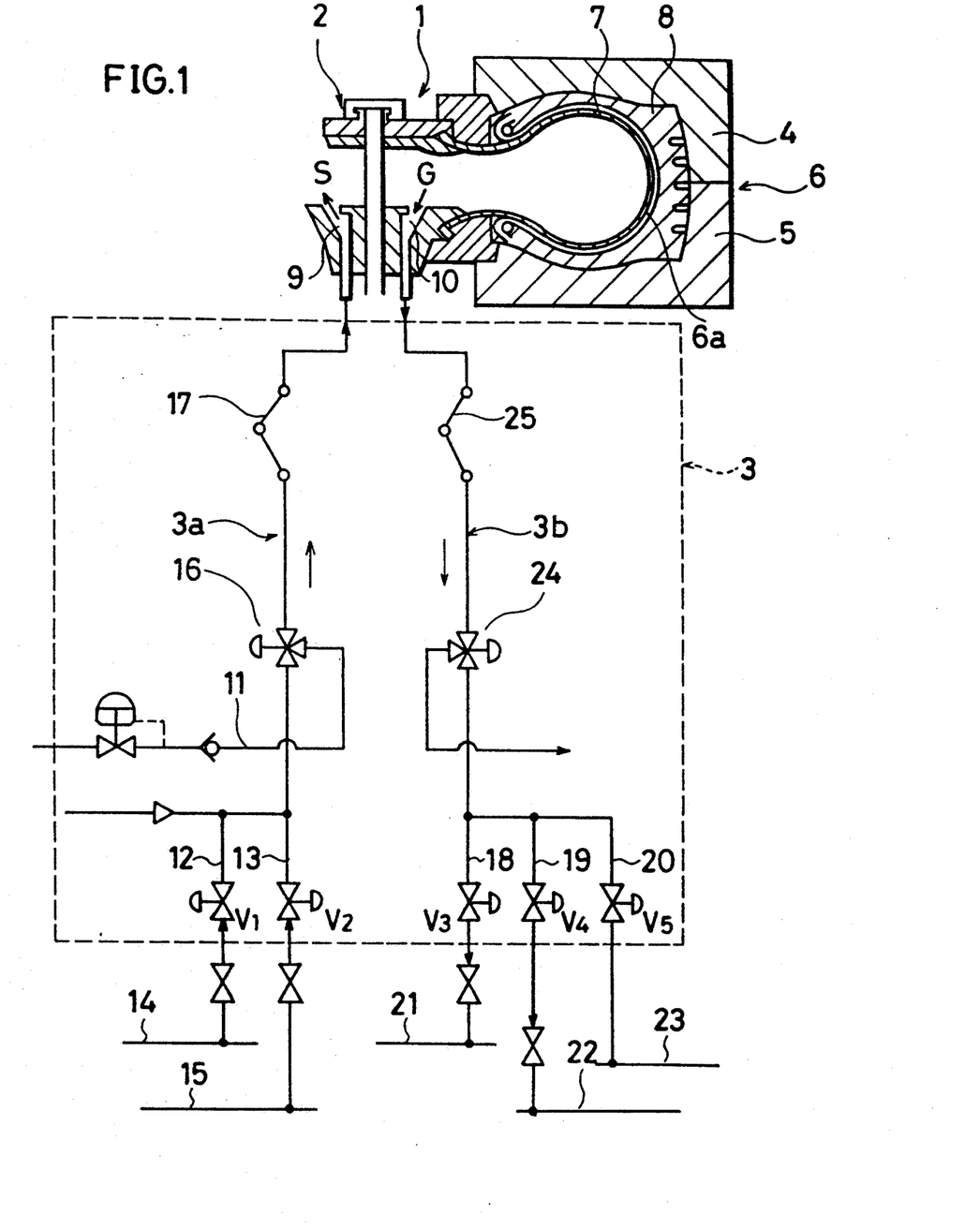
FIG. 1 is a schematic diagram of a vulcanizing apparatus in which a method for vulcanizing an elastomeric product of the present invention is carried out.

Preferred embodiments of the present invention will be described with reference to the drawings. FIG. 1 shows a vulcanizing apparatus 1 in which a tire is vulcanized in accordance with the present invention. The vulcanizing apparatus 1 includes a vulcanizing unit 2 and a piping system 3. The vulcanizing unit 2 includes a mold 6 having an upper mold 4 and a lower mold 5, and a bladder 7 made of rubber. An elastomeric product 6a is defined by the mold 6 and the bladder 7. A raw tire 8, which is an elastomeric product to be vulcanized, is placed in the vulcanizing chamber 6a. After being placed in the vulcanizing chamber 6a, the raw tire 8 is heated and pressurized to vulcanize. However, it should be noted that the tire 8 shown in FIG. 1 is illustrated not as a raw tire, but as an already vulcanized tire or a tire being vulcanized. Also, it should be noted that the present invention can be performed in a vulcanizing apparatus without using a bladder.

The vulcanizing unit 2 has a blowing opening 9 and a discharging opening 10 which are communicated with respective vulcanizing medium sources (not shown) by way of a piping system 3. The piping system 3 is roughly divided into a supply section 3a for supplying the vulcanizing medium to the vulcanizing unit 2 and a discharge section 3b for discharging the vulcanizing medium from the vulcanizing unit 2.

The supply section 3a includes a preshaping fluid supply pipe 11 for supplying a preshaping medium, such as gas, or steam, and a pressurizing medium supply pipe 12 for supplying a pressurizing medium, such as nitrogen gas, combustion gas, and a heating medium supply pipe 13 for supplying a heating medium, such as steam.

The pressurizing medium supply pipe 12 is communicated with a gas main pipe 14 by way of a first valve V1. The heating medium supply pipe 13 is communicated with a steam main pipe 15 by way of a second valve V2. The pressurizing medium supply pipe 12 and the heating medium supply pipe 13 are communicated with the blowing opening 9 by way of a valve 16 and a flexible pipe 17. Also, the preshaping medium supply pipe 11 is communicated with the blowing opening 9 by way of the valve 16.

The discharge section 3b includes a drain discharge pipe 18, a gas discharge pipe 19, and a vacuum pipe 20. The drain discharge pipe 18 is communicated with a drain main pipe 21 by way of a third valve V3. The gas discharge pipe 19 is communicated with a discharge gas main pipe 22 by way of a fourth valve V4. The vacuum pipe 20 is communicated with a vacuum main pipe 23 by way of a fifth valve V5. The drain discharge pipe 18, the gas discharge pipe 19, and the vacuum pipe 20 are communicated with the discharging opening 10 by way of a valve 24 and a flexible pipe 25.

Figure 2:
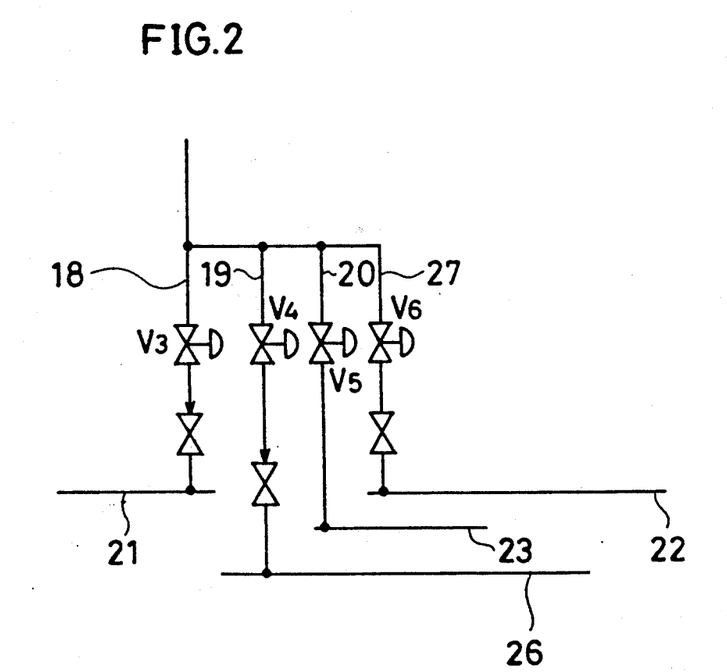
FIG. 2 is a diagram showing another discharge section of the vulcanizing apparatus of FIG. 1.

Also, as shown in FIG. 2, it is preferable to connect a gas recovery pipe 26 to the gas discharge pipe 19 to recover the discharged gas to reuse it as preshaping gas. In this case, another gas discharge pipe 27 is provided and it is communicated with the discharge gas main pipe 22 by way of a sixth valve V6.

Next, a vulcanizing method of the present invention will be described which is carried out with use of the above-mentioned vulcanizing apparatus 1.

In a first stage, the raw tire 8 is set in the mold 6. Subsequently, the upper mold 4 and the lower mold 5 are closed, which means the molds are coupled and pressed against each other at a predetermined pressure, while performing the preshaping process.

In a second stage, the raw tire 8 is heated by supplying steam as heating medium into the bladder 7 by closing the valves V1, V3, V4, and V5, and opening the second valve V2. For example the steam is supplied at a pressure of 14 kg/cm$^2$ for 2 minutes. Thus, a first heating step is performed.

In a third stage, when a surface portion of the tire 8 is in a cure rate (ECU) of 15 percents or less, e.g., in a lapse of 2 minutes after supplying the steam, the valve V1 is opened and the valve V2 is closed so that gas is supplied into the bladder 7 as pressurizing medium. For example, the gas is supplied at a pressure 20 kg/cm$^2$ for 13 minutes. Thus, is a first pressurizing step is performed. Bladder 7 is thus filled with a mixture of both the steam and the gas.

In a fourth stage, when air trapped in the tire or between the tire 8 and the mold 6 is discharged, or when the rubber fluidity comes to an end, the mixture in the bladder 7 is replaced with steam (heating medium) by closing the valve V1 and opening the valves V2 and V3. Namely, a steam blowing step is performed for 1 minute. Thereafter, the valve V3 is closed while the steam continues to be supplied. For example, the steam is supplied at a pressure of 14 kg/cm$^2$ for 1 minute to heat the tire 8. Thus, a second heating step 3 is performed.

In a fifth stage, when the tire 8 has been supplied with the heat or thermal energy necessary for completing vulcanization, the valve V2 is closed and the valve V1 is opened to thereby supply the pressurizing gas. For example, the gas is supplied at a pressure of 20 kg/cm$^2$ for 28 minutes. Thus, a second pressurizing step is performed.

In a sixth stage, the valve V1 is closed and the valve V4 is opened so that a mixture of the steam and the gas, or the gas is discharged from the bladder 7 for a predetermined time, e.g., 30 seconds. Namely, a discharging process is performed.

In a seventh state, the valve V4 is closed and the valve V5 is opened so that the mixture of the steam and the gas, or the gas, is vacuumed out of the bladder 7 for a predetermined time, e.g., 30 seconds. Namely, a vacuuming process is performed. After the pressure in the bladder 7 becomes zero, the mold 6 is opened and the vulcanized tire 8 is removed from the vulcanizing unit 2.

As mentioned above, the first heating step (14 kg/cm$^2$, 2 minutes), the first pressurizing step (20 kg/cm$^2$, 13 minutes), the steam blowing step (1 minute), the second heating step (14 kg/cm$^2$, 1 minute), the second pressurizing step (20 kg/cm$^2$, 28 minutes), the discharging process (30 seconds), and the vacuuming process (30 seconds) are performed in the order stated above.

The steam blowing step is performed to discharge the pressurizing medium (nitrogen gas) from the bladder 7 and to ensure the entire replacement of the pressurizing medium with the heating medium (steam). In other words, the steam blowing step is performed in order to ensure that the second heating step will compensate for the insufficient heating obtained from the first heating step.

Figure 7:
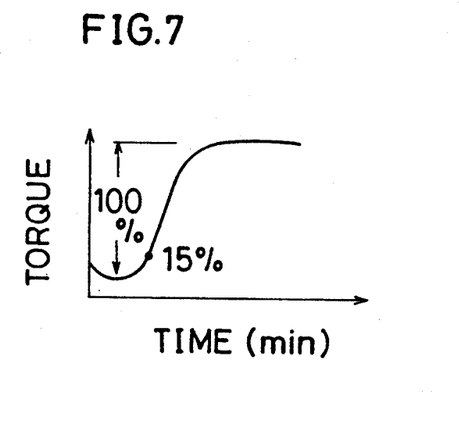
FIG. 7 is a graph showing the vulcanization rate in a surface portion of an elastomeric product.

The reason why the first heating process is terminated when the surface portion is in the cure rate (ECU) of 15 percent or less is that rubber fluidity occurs during a vulcanization rate of 15 percent or less as shown in FIG. 7. Also, it is very effective and very easy to perform steam blowing in order to replace the pressurizing medium with the heating medium.

The second heating step is switched to the second pressurizing step when a predetermined time, which allows for the tire temperature to reach the level necessary for vulcanization, has elapsed. The temperature level necessary for cure is determined in consideration of the critical temperature of components of the tire and vulcanization time.

Figure 3:
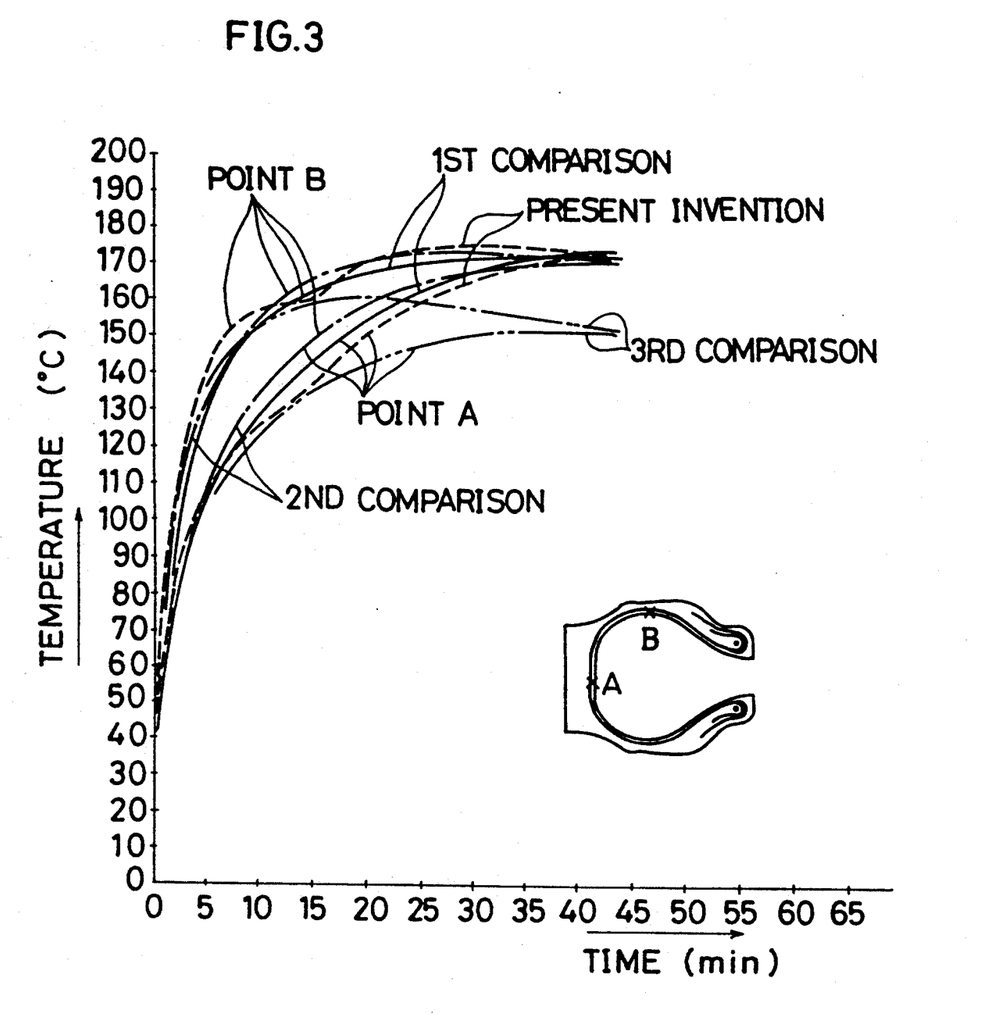
FIG. 3 is a graph showing comparatively temperature rises of elastomeric products under four different vulcanizations.

FIG. 3 shows temperature rises at two points A and B of tires which are vulcanized in accordance with the method of the present invention and by three different comparative methods. Point A refers to a position of an inner liner of the tire where the temperature rises the slowest and Point B refers to a position on the inner liner where the temperature rises the fastest. Curves drawn with broken lines show the temperature of a tire according to the present invention. Curves drawn with solid lines show the temperature of a tire according to the first comparison method. Curves drawn with one-dot chain lines show the temperature of a tire according to the second comparison method. Curves drawn with two-dot chain lines show the temperature of a tire according to the third comparison method.

Figure 4:
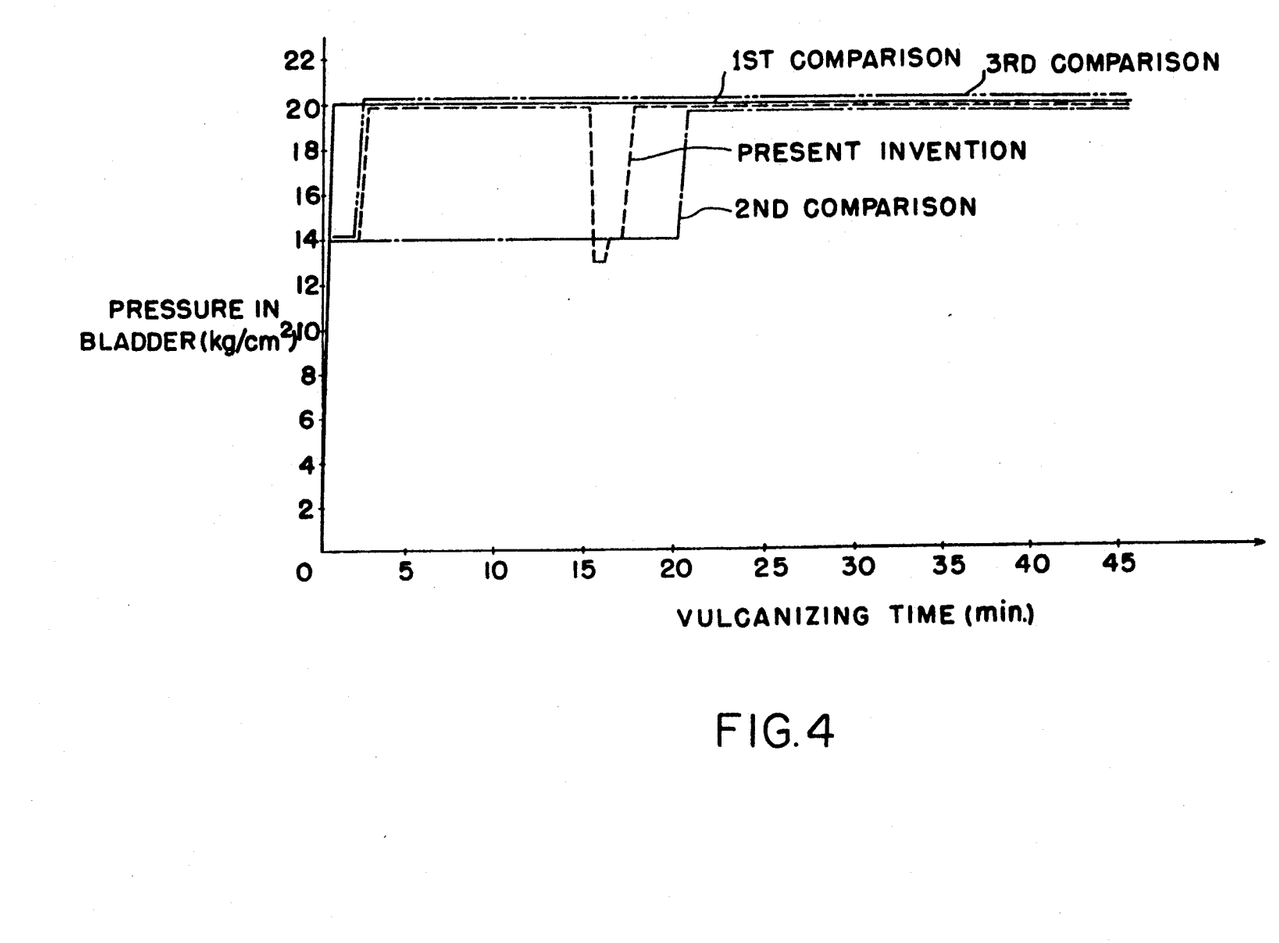
FIG. 4 is a graph showing pressure changes in bladders under the four different vulcanizations.

In the first comparison method, a raw tire was heated and pressurized by use of hot water having a pressure of 20 kg/cm$^2$ and a temperature of 180° C. for 45 minutes. In the second comparison method, a raw tire was heated at a pressure of 14 kg/cm$^2$ for 20 minutes, and then pressurized at a pressure of 20 kg/cm$^2$ for 25 minutes. In the third comparison method, a raw tire was heated at a pressure of 14 kg/cm$^2$ for 2 minutes, and then pressurized at a pressure of 20 kg/cm$^2$ for 43 minutes. FIG. 4 shows respective pressure changes in bladders of the present method, first comparison method, second comparison method, and third comparison method.

From the graphs shown in FIG. 3 and FIG. 4, the following will be seen.

Comparison of the present method to the first comparison method reveals that the the present method provides for substantially the same temperature rises as the first comparison method of the hot water vulcanization. Also, the pressure in the bladder can be increased to a high value in a short amount of time after the start of vulcanization. Accordingly, the present method can obtain substantially the same vulcanization time as the hot water vulcanization without degrading the quality of tire.

Comparison of the present method to the second comparison method reveals that the present method can increase the pressure in the bladder to the high value in a shorter time after the start of vulcanization. Also, the present method can give substantially the same thermal value (quantity of heat) to the tire as the second comparison method. Accordingly, the present method can obtain as short a vulcanization time as the second comparison method, and thus eliminate air trapping and bareness.

With comparison of the present method to the third comparison method, the third comparison method attains the high bladder pressure in the same time from the start of vulcanization as the present method. However, the third comparison method has a longer vulcanization time in total due to the fact the shortage of heat quantity resulted from the heating process of the third comparison method being performed for no more than 2 minutes has to be made up for.

In the present method, as shown in FIG. 4, the pressure in the bladder lowers to about 13 kg/cm$^2$ at a mid time of the vulcanization, specifically, after the lapse of 15 to 17 minutes from the start of vulcanization. However, in hot water vulcanization using cooling water or other vulcanizations, the bladder pressure will generally drop to such a value, which causes no trouble with the quality of tire. Further, this pressure drop can be prevented by making the diameter of the pipe for steam blowing smaller, or providing the pipe with an orifice.

In the above-mentioned method of the present invention, the entirety of the mixture of steam (heating medium) and nitrogen gas (pressurizing medium), or the entirety of nitrogen gas (pressurizing medium) is replaced with steam by the steam blowing step.

However, there is a case that due to a short steam blowing, nitrogen gas (pressurizing medium) is not entirely replaced with steam (heating medium). Also, there is a case that due to the existence of a great pressure difference between steam and nitrogen gas, the bladder is entirely filled with only nitrogen gas (pressurizing medium) when changing from the heating process to the pressurizing process.

In other words, in a case that a heating process is firstly performed, a pressurizing process is secondly performed, and another heating process is performed again, it is required that the entirety or a part of the pressurizing medium, or the entirety or a part of the mixture of the heating medium and the pressurizing medium is replaced with the heating medium supplied in the second heating process. Also, it is preferable to increase the bladder pressure to the high value promptly.

Figure 5:
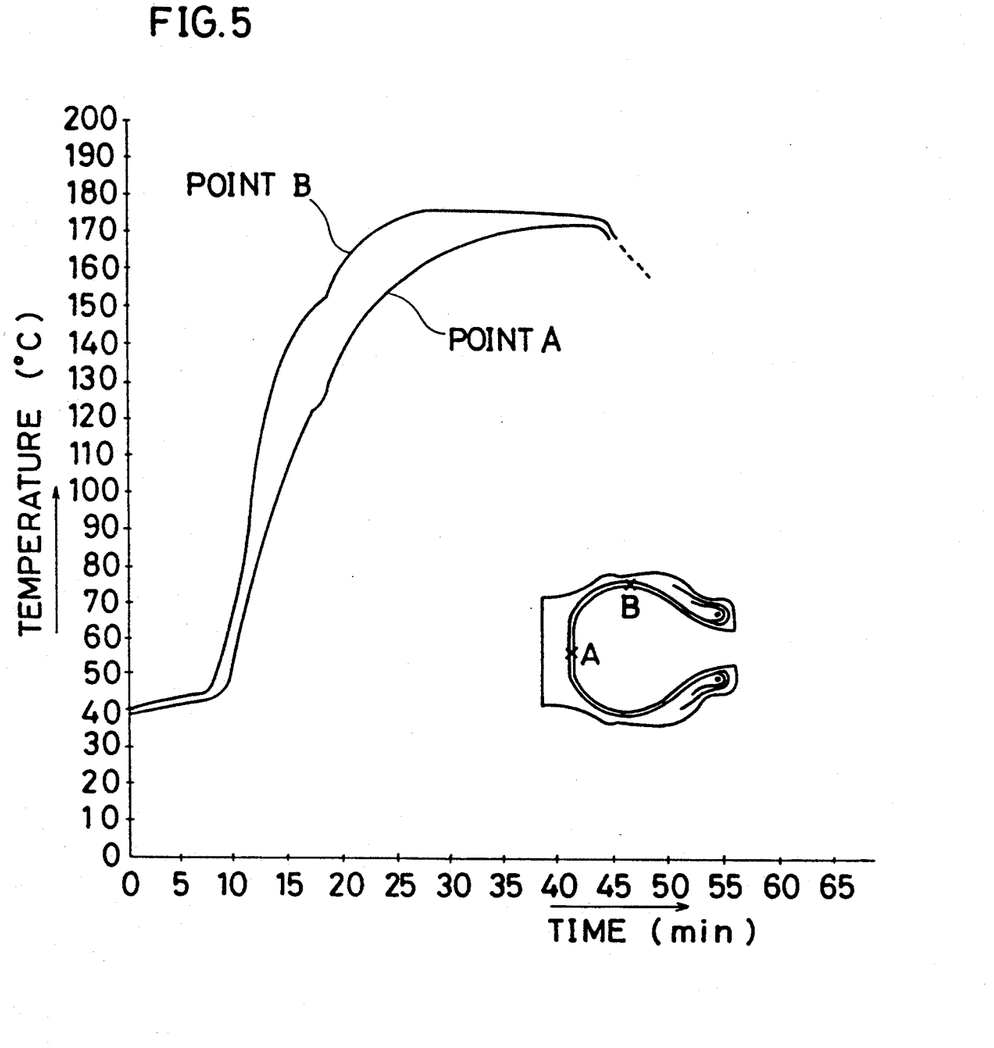
FIG. 5 is a graph showing temperature rises of an elastomeric product under another vulcanizing method of the present invention.
Figure 6:
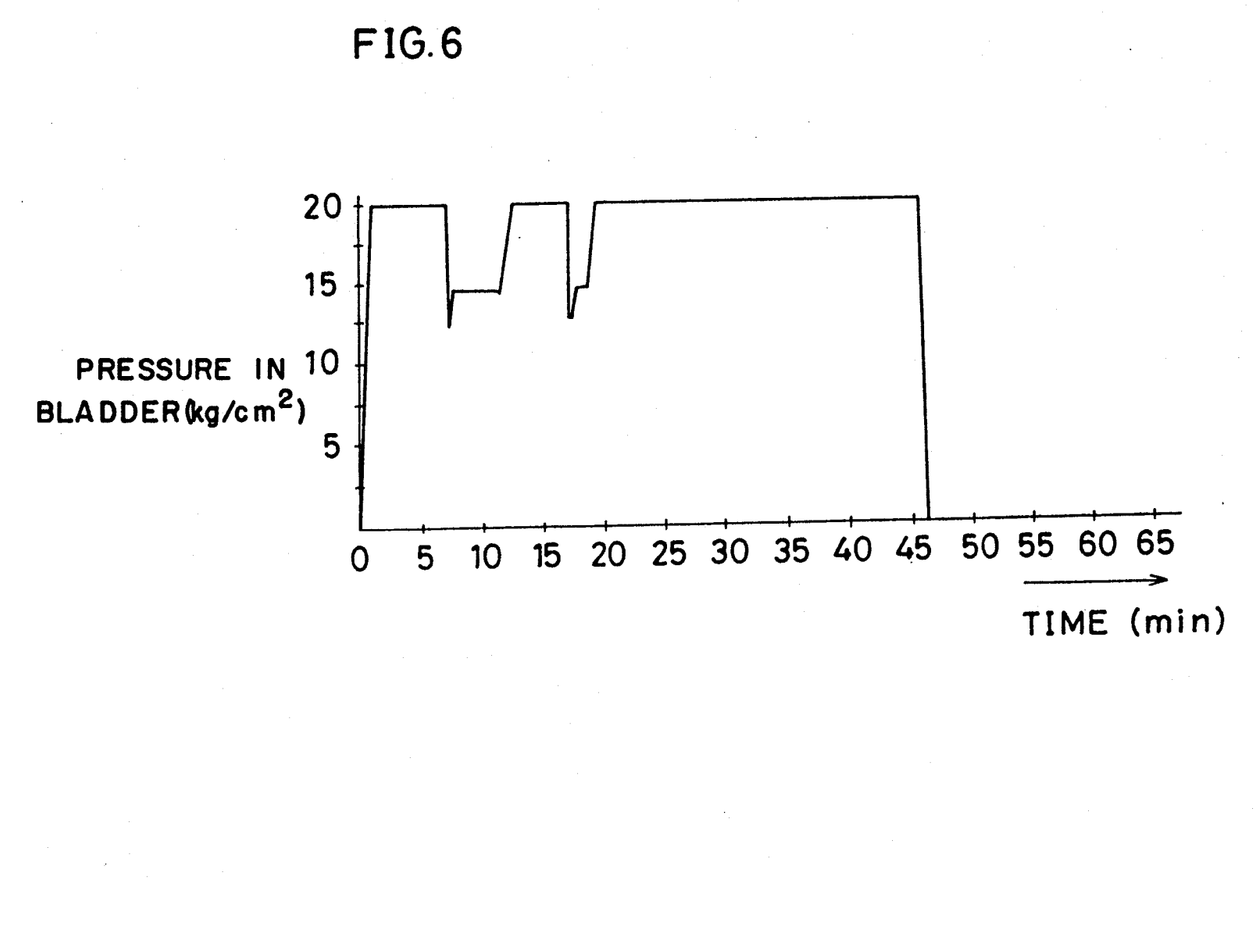
FIG. 6 is a graph showing a pressure change in a bladder under the another vulcanizing method of the present invention.

In another embodiment of the present invention, as shown in FIG. 5 and FIG. 6, a first pressurizing step is performed by supplying pressurizing medium having higher pressure than the heating medium. Next, a first heating step is performed by replacing the entirety or a part of the pressurizing medium with the heating medium after a first steam blowing step is performed. Thereafter, a second pressurizing step is performed by supplying the pressurizing medium. Next, a second heating process is performed by replacing the entirety or a part of the pressuring medium, or the entirety or a part of a mixture of the pressuring medium and the heating medium with the heating medium after conducting a second steam blowing process is performed step. Thereafter, a third pressurizing step is performed by supplying the pressurizing medium to complete vulcanization.

Specifically, the first pressurizing step is performed at a pressure of 20 kg/cm$^2$ for 7 minutes. The first steam blowing step is performed for 30 seconds. The first heating process is performed at a pressure of 14 kg/cm$^2$ for 4 minutes 30 seconds. The second pressurizing step is performed at a pressure of 20 kg/cm$^2$ for 5 minutes. The second steam blowing step is performed for 1 minute. The second heating step is performed at a pressure 14 kg/cm$^2$ for 1 minute. The third pressurizing step is performed at a pressure of 20 kg/cm$^2$ for 26 minutes. The discharging process is performed for 30 seconds. Finally, the vacuuming process is performed for 30 seconds.

In an early stage of the heating step, the heating step is switched to the pressurizing step which is accomplished by introducing the pressurizing medium. Also, the pressurizing step is switched to the heating step again when air trapped in the tire, or between the tire, and the mold surface, has been eliminated, or rubber fluidity has come to an end. Thus, a lack of thermal energy due to the fact that the initial heating process is shortened can be compensated for by the second heating step. Accordingly, the thermal value necessary for vulcanization can be given without prolonging the vulcanization time. Thereafter, another pressurizing step is performed at a high pressure. Namely, high pressure vulcanization is completed. In other words, when the raw rubber is fluid-like due to the temperature rise, vulcanization is executed at a high pressure. After the trapped air is eliminated, or there is no longer the danger of generating bareness (namely rubber fluidity comes to an end), another heating step is performed. Consequently, the surface of the tire can be formed perfectly, following the mold surface.

This method can prevent air from being trapped in the elastomeric product, air from being trapped between the mold and the product, and a bareness in a surface portion of the elastomeric product perfectly.

As mentioned above, the present invention can provide a shortened vulcanization time. Accordingly, the present invention makes it possible to eliminate air trapping and bareness troubles and also eliminates under cure troubles. Thus, the present invention can produce an elastomeric product having a higher quality with a reduced cost.

In the first embodiment of the present invention, two heating steps and two pressurizing processes are performed. In the second embodiment, two heating steps and three pressurizing steps are performed. However, it should be noted that the number of heating and pressurizing steps are not limited to the above-mentioned first and second embodiments. Also, it should be noted that the time of each process is not limited to the above-mentioned first and second embodiments.

Although the present invention has been fully described by way of method with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A process for vulcanizing an elastomeric product comprising the steps of:
   (A) placing an elastomeric product into a mold;
   (B) applying, sequentially and alternately, at least two each of a heating step and a pressurizing step to the elastomeric product in order to effect vulcanization; and
   (C) removing the vulcanized elastomeric product from said mold;
   wherein said heating steps are carried out at a lower pressure than said pressurizing steps and wherein a duration of heating in said first stage heating is greater than a duration of heating in said second stage heating and a duration of the first stage pressurizing is less than a duration of the second stage pressurizing.

2. The process according to claim 1, wherein the first of said at least two heating steps is carried out until the elastomeric product is at most 15% cured.

3. The process according to claim 1, wherein the pressurizing step that is applied subsequently to a first heating step is carried out until said elastomeric product is no longer fluid-like.

4. The process according to claim 1, wherein the pressurizing step that is applied subsequently to a first heating step is carried out until the air trapped in the elastomeric product and between the elastomeric product and the mold is eliminated.

5. The process according to claim 1, wherein said heating and pressurizing steps of said step B comprise:
   (1) a first pressurizing step;
   (2) a first heating step;
   (3) a second pressurizing step;
   (4) a second heating step; and
   (5) a third pressurizing step.

6. The process according to claim 1, wherein said mold includes a bladder.

7. The process according to claim 6, wherein said heating steps are carried out by supplying a heating medium into said bladder.

8. The process according to claim 7, wherein said heating medium comprises steam.

9. The process according to claim 6, wherein said pressurizing steps are carried out by supplying a pressurizing medium into said bladder.

10. The process according to claim 9, wherein said pressurizing medium comprises a gas.

11. A process for vulcanizing an elastomeric product comprising the steps of:
    (A) placing an elastomeric product into a mold;
    (B) applying, sequentially and alternately, at least two each of a heating step and a pressurizing step to the elastomeric product in order to effect vulcanization; and
    (C) removing the vulcanized elastomeric product from said mold;
    wherein said heating steps are carried out at a lower pressure than said pressurizing steps and wherein said two heating steps are performed at the same pressure, said two pressurizing steps are performed at the same pressure and a first one of said pressurizing steps is performed for a duration necessary to vulcanize said elastomeric product.

12. The process according to claim 11, wherein the first of said at least two heating steps is carried out until the elastomeric product is at most 15% cured.

13. The process according to claim 11, wherein the pressurizing step that is applied subsequently to a first heating step is carried out until said elastomeric product is no longer fluid-like.

14. The process according to claim 11, wherein the pressurizing step that is applied subsequently to a first heating step is carried out until the air trapped in the elastomeric product and between the elastomeric product and the mold is eliminated.

15. The process according to claim 11, wherein said heating and pressurizing steps of said step B comprise:
    (1) a first pressurizing step;
    (2) a first heating step;
    (3) a second pressurizing step;
    (4) a second heating step; and
    (5) a third pressurizing step.

16. The process according to claim 11, wherein said mold includes a bladder.

17. The process according to claim 16, wherein said heating steps are carried out by supplying a heating medium into said bladder.

18. The process according to claim 17, wherein said heating medium comprises steam.

19. The process according to claim 16, wherein said pressurizing steps are carried out by supplying a pressurizing medium into said bladder.

20. The process according to claim 19, wherein said pressurizing medium comprises a gas.

21. The process according to claim 20, wherein said gas comprises at least one gas selected from the group consisting of nitrogen gas and combustion gas.

* * * * *